US011366782B2

(12) United States Patent
Guim Bernat et al.

(10) Patent No.: US 11,366,782 B2
(45) Date of Patent: Jun. 21, 2022

(54) EDGE COMPONENT COMPUTING SYSTEM HAVING INTEGRATED FAAS CALL HANDLING CAPABILITY

(71) Applicant: Intel Corporation, Santa Clara, CA (US)

(72) Inventors: Francesc Guim Bernat, Barcelona (ES); Karthik Kumar, Chandler, AZ (US); Mustafa Hajeer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/363,867

(22) Filed: Jun. 30, 2021

(65) Prior Publication Data

US 2021/0326299 A1    Oct. 21, 2021

Related U.S. Application Data

(63) Continuation of application No. 16/373,339, filed on Apr. 2, 2019, now Pat. No. 11,055,256.

(51) Int. Cl.
*G06F 15/173*   (2006.01)
*H04L 67/1097*   (2022.01)
*G06F 15/167*   (2006.01)
*H04L 9/40*   (2022.01)

(52) U.S. Cl.
CPC ...... *G06F 15/17331* (2013.01); *G06F 15/167* (2013.01); *H04L 63/08* (2013.01); *H04L 63/0892* (2013.01); *H04L 63/102* (2013.01); *H04L 67/1097* (2013.01)

(58) Field of Classification Search
CPC . G06F 15/17331; G06F 15/167; H04L 63/08; H04L 63/0892; H04L 63/102; H04L 67/1097
USPC ........................................................ 709/212
See application file for complete search history.

(56) References Cited

U.S. PATENT DOCUMENTS

| | | | |
|---|---|---|---|
| 6,791,988 B1 * | 9/2004 | Hameleers | H04W 88/16 370/466 |
| 8,090,832 B1 * | 1/2012 | Semke | H04L 69/32 709/213 |
| 8,423,529 B1 * | 4/2013 | Bloomstein | G06F 16/188 707/706 |
| 9,229,854 B1 * | 1/2016 | Kuzmin | G06F 3/0679 |
| 9,258,412 B1 * | 2/2016 | Trandal | H04M 3/42 |
| 10,148,736 B1 * | 12/2018 | Lee | G06F 9/4881 |
| 10,360,025 B2 | 7/2019 | Foskett et al. | |

(Continued)

OTHER PUBLICATIONS

Extended European Search Report for Patent Application No. 20 164 626.2, dated Aug. 19, 2020, 9 pages.

(Continued)

*Primary Examiner* — Melvin H Pollack
(74) *Attorney, Agent, or Firm* — Compass IP Law PC

(57) ABSTRACT

An apparatus is described. The apparatus includes logic circuitry embedded in at least one of a memory controller, network interface and peripheral control hub to process a function as a service (FaaS) function call embedded in a request. The request is formatted according to a protocol. The protocol allows a remote computing system to access a memory that is coupled to the memory controller without invoking processing cores of a local computing system that the memory controller is a component of.

20 Claims, 5 Drawing Sheets

(56) References Cited

U.S. PATENT DOCUMENTS

| | | | |
|---|---|---|---|
| 10,402,187 B2 | 9/2019 | Turovsky et al. | |
| 10,419,550 B2 | 9/2019 | Nainar et al. | |
| 10,432,537 B2 | 10/2019 | Zhang et al. | |
| 10,462,112 B1 | 10/2019 | Makmel et al. | |
| 10,467,045 B1 | 11/2019 | Braverman et al. | |
| 10,467,149 B2 | 11/2019 | Kawahara | |
| 10,514,958 B2 | 12/2019 | Kumar et al. | |
| 10,528,367 B1 | 1/2020 | Liu et al. | |
| 10,541,938 B1 | 1/2020 | Timmerman et al. | |
| 10,554,689 B2 | 2/2020 | Reddy et al. | |
| 10,565,034 B2 | 2/2020 | Zhang et al. | |
| 10,592,280 B2 | 3/2020 | Ballantyne et al. | |
| 10,601,672 B2 | 3/2020 | Jeuk et al. | |
| 10,606,576 B1 | 3/2020 | Tung et al. | |
| 10,613,901 B1 | 4/2020 | Mehr | |
| 10,621,001 B1 | 4/2020 | Braverman et al. | |
| 10,621,004 B2 | 4/2020 | Wood et al. | |
| 10,628,299 B1 | 4/2020 | Schneider et al. | |
| 10,637,724 B2 | 4/2020 | Johnson et al. | |
| 10,742,750 B2 | 8/2020 | Johnson et al. | |
| 10,747,580 B2 | 8/2020 | Vaikar | |
| 10,783,015 B2 | 9/2020 | On et al. | |
| 10,796,058 B1 | 10/2020 | Mezei et al. | |
| 2006/0104221 A1* | 5/2006 | Norton | H04M 3/56 370/261 |
| 2011/0158129 A1* | 6/2011 | Liu | H04L 65/103 370/352 |
| 2012/0226742 A1* | 9/2012 | Momchilov | G06F 9/452 709/203 |
| 2012/0233668 A1* | 9/2012 | Leafe | G06F 9/44526 726/4 |
| 2012/0250512 A1* | 10/2012 | Jagadeeswaran | H04L 47/12 370/235.1 |
| 2014/0019609 A1* | 1/2014 | Williams | H04L 43/18 709/224 |
| 2014/0280894 A1* | 9/2014 | Reynolds | H04L 43/0876 709/224 |
| 2016/0219024 A1* | 7/2016 | Verzun | H04L 9/34 |
| 2017/0269947 A1* | 9/2017 | Johnson | G06F 13/4081 |
| 2017/0339247 A1* | 11/2017 | Tiwari | H04W 76/12 |
| 2018/0225230 A1* | 8/2018 | Litichever | G06F 13/107 |
| 2019/0132381 A1* | 5/2019 | Momchilov | G06F 3/14 |
| 2019/0303018 A1 | 10/2019 | Huang et al. | |
| 2019/0303211 A1 | 10/2019 | Dias et al. | |
| 2019/0303212 A1 | 10/2019 | Bosch et al. | |
| 2019/0312800 A1 | 10/2019 | Schibler et al. | |
| 2019/0312899 A1 | 10/2019 | Shulman et al. | |
| 2019/0317808 A1 | 10/2019 | Srinivasan et al. | |
| 2019/0324813 A1 | 10/2019 | Bogineni et al. | |
| 2019/0332781 A1 | 10/2019 | Natanzon | |
| 2019/0347134 A1 | 11/2019 | Zhuo et al. | |
| 2019/0349447 A1 | 11/2019 | Adams et al. | |
| 2019/0377604 A1 | 12/2019 | Cybulski | |
| 2019/0384655 A1 | 12/2019 | Singuru | |
| 2020/0007388 A1 | 1/2020 | Johnston et al. | |
| 2020/0012545 A1 | 1/2020 | Zhang et al. | |
| 2020/0026444 A1 | 1/2020 | Dai et al. | |
| 2020/0057618 A1 | 2/2020 | Alex et al. | |
| 2020/0057676 A1 | 2/2020 | Vaikar | |
| 2020/0057677 A1 | 2/2020 | Ritter et al. | |
| 2020/0067789 A1 | 2/2020 | Khuti et al. | |
| 2020/0081858 A1 | 3/2020 | Philmore et al. | |
| 2020/0084202 A1 | 3/2020 | Smith et al. | |
| 2020/0089547 A1 | 3/2020 | Rempel et al. | |
| 2020/0097310 A1 | 3/2020 | Shukla et al. | |
| 2020/0097323 A1 | 3/2020 | Nider et al. | |
| 2020/0097393 A1 | 3/2020 | Moore et al. | |
| 2020/0104309 A1 | 4/2020 | Borges et al. | |
| 2020/0104378 A1 | 4/2020 | Wagner et al. | |
| 2020/0117470 A1 | 4/2020 | Vaikar | |
| 2020/0120120 A1 | 4/2020 | Cybulski | |
| 2020/0220924 A1 | 7/2020 | Yang et al. | |
| 2020/0225983 A1 | 7/2020 | Jung et al. | |
| 2020/0285588 A1 | 9/2020 | Quinn et al. | |
| 2020/0310828 A1 | 10/2020 | Turull et al. | |
| 2020/0314168 A1 | 10/2020 | Nauerz et al. | |

OTHER PUBLICATIONS

Avram, Abel. "Faas, PaaS, and the Benefits of the Serverless Architecture," InfoQ, Jun. 25, 2016. (Year: 2016).

Dragojevic, et al., "FaRM: Fast Remote Memory" USENIX Association, 11th USENIX Symposium on Networked Systems Design and Implementation, Apr. 2, 2014, pp. 401-414.

Halpern, J and Pignataro, C. "Service Function Chaining (SFC) Architecture," RFC 7665, Oct. 2015. (Year: 2015).

JEDEC About Page. (Year: 2020).

Lever, C. "Bidirectional Remote Procedure Call on RPC over ROMA Transports," RFC 8167, Jun. 2017. (Year: 2017).

Roberts, Mike. "Serverless Architectures," Martin Fowler, May 22, 2018. (Year: 2018).

Xu, et al., "BlueCache: A Scalable Distributed Flash-based Key-value Store", Proceedings of the VLDB Endowment, Nov. 1, 2016, vol. 10, No. 4, pp. 301-312.

\* cited by examiner

EDGE COMPONENT COMPUTING SYSTEM HAVING INTEGRATED FAAS CALL HANDLING CAPABILITY

This application is a continuation of and claims the benefit of U.S. patent application Ser. No. 16/373,339, entitled, "EDGE COMPONENT COMPUTING SYSTEM HAVING INTEGRATED FAAS CALL HANDLING CAPABILITY", filed Apr. 2, 2019, which is incorporated by reference in its entirety.

FIELD OF INVENTION

The field of invention pertains generally to the computing sciences, and, more specifically, to an edge component computing system having integrated FaaS call handling capability.

BACKGROUND

With the emergence of "cloud" computing in which client devices invoke application software or other services over a network, IS managers are increasingly looking for new ways to architect the cloud so that propagation delays associated with the invocation of services over a network is reduced.

FIGURES

A better understanding of the present invention can be obtained from the following detailed description in conjunction with the following drawings, in which.

DETAILED DESCRIPTION

Figure 1:
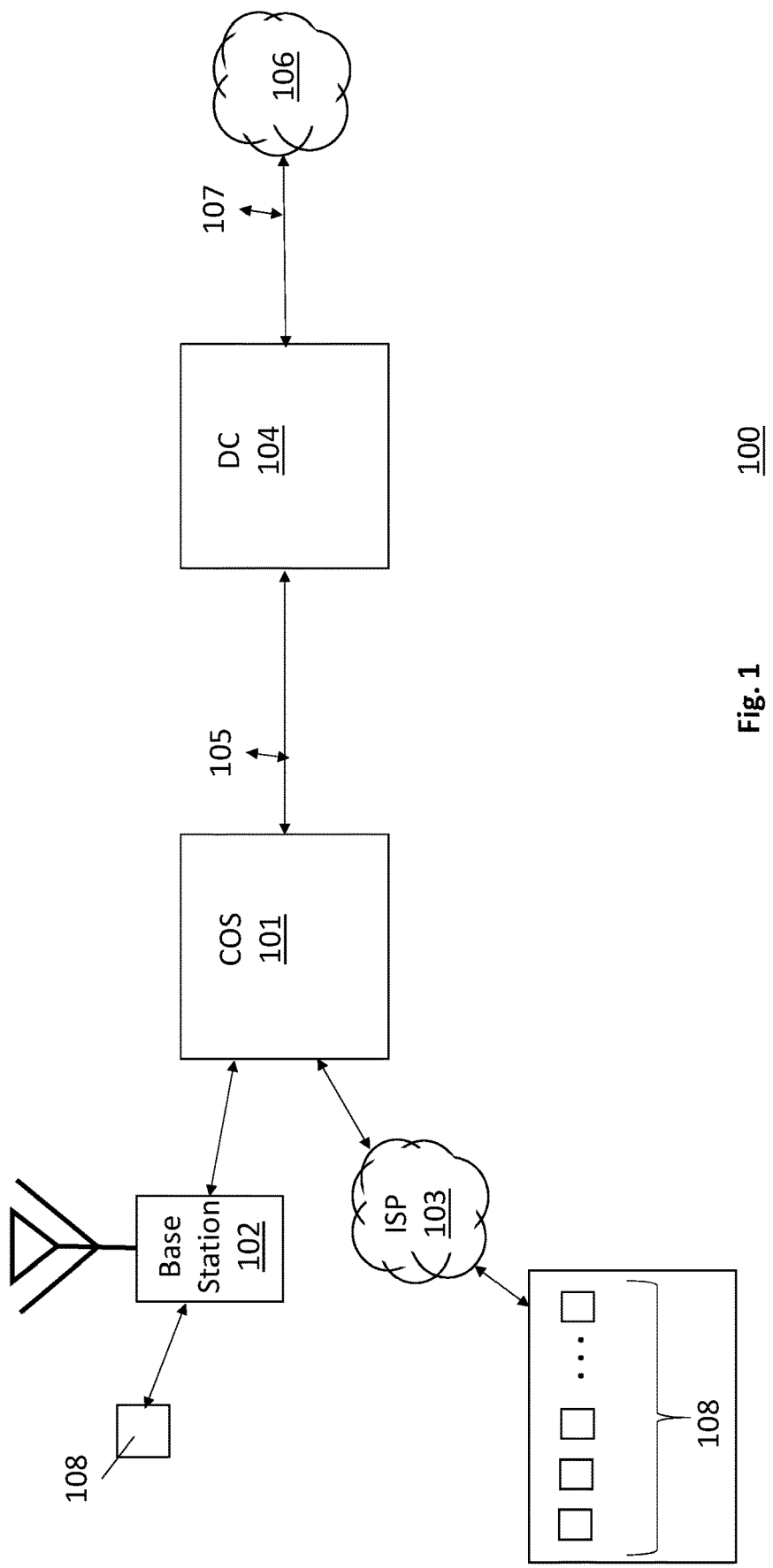
FIG. 1 shows an information systems (IS) infrastructure.

FIG. 1 shows an information systems (IS) deployment 100 that is common to large entities such as large corporations and/or large government entities. As observed in FIG. 1, a central office switch 101 acts as a gateway between more regional/local networking infrastructure (e.g., a base station 102, local internet service provider 103, etc.) and the entity's data center 104. Here, not uncommonly, one or more high speed trunk lines 105 carry data traffic between the central office switch 101 and the data center 104 over a long geographic distance that separates the central office switch 101 and the data center 104.

The data center 104, in turn, relies upon a cloud service 106 for one or more IS services (e.g., cloud computing, cloud storage, etc.). Here, various client devices 108 (e.g., mobile devices (e.g., smartphones, laptop computers) and/or desktop computers, tower computers, etc.) access data that is stored by the cloud service 106 and/or access/invoke applications that the cloud service 106 is executing.

With respect to the clients' invocation of applications that the cloud service 106 is executing, according to a basic and traditional configuration, the application is continuously executing in the cloud 106 and the entity is bearing the cost of its continuous execution in large time increments (e.g., the entity pays by the hour or by the second for its usage of the application). This particular configuration can be particularly inefficient, e.g., in the case of a cloud application whose invocations or function calls can be fully processed (completed) in much smaller time increments and/or a cloud application that is sparsely used over time by the entity. In such circumstances the entity essentially pays for application resources that the entity does not actually use.

An emerging trend, referred to as "Function As A Service" (FaaS), granularizes payments so that they are based on much smaller time increments (e.g., tenths of seconds or less). With FaaS, the entity's payments correlate much closer to its actual usage, particularly for applications that complete their invocations in short time periods and/or applications that are sparsely used over time by the entity. Current examples of FaaS include AWS Lambda offered by Amazon's Cloud Computing Plartform (AWS), Google Cloud Functions offered by Google's (and/or its parent Alphabet's) cloud computing platform (Google Cloud), Microsoft Azure Functions offered by Microsoft's Azure Cloud Computing Platform (Azure), OpenWhisk offered by IBM and/or Apache, and Oracle Cloud Fn offered by Oracle.

Another emerging trend is edge computing. Referring again to FIG. 1, note the long distance (e.g., geographic (in terms of physical distance) and/or logical (in terms of nodal hops over the infrastructure 100)), that exists between a cloud application that is executing in the cloud service 106 and a client 108 that invokes the application. In use cases where large amounts of data traffic are transported over the trunk line 105 between the cloud service 106 and the data center 104, and/or the trunk line 107 between the data center 104 and the central office 101, significant time delays can be observed by a client device 108 that is invoking an application in the cloud 106.

In order to reduce such delays, IS managers are seeking to push functionality out of the cloud 106 towards a processing resource that is much closer to an invoking client 108. As such, IS managers are seeking ways, for example, to push application functionality into any/all of the local central office switch 101, the base station 102 that a mobile client is communicating with, and/or the hardware resources of the client devices' local ISP 103.

Here, FaaS costs can be particularly sensitive to the time delays associated with large geographic distances and/or too many IS nodal hops between an invoking client 108 and an application that is executing in the cloud. For example, consider a client device 108 that, under a FaaS payment structure, calls an application in the cloud 106 to perform a search of the client's files (the clients files are also stored in the cloud 106). Here, the cloud application can determine the files to be searched (e.g., from the identity of the calling device, a memory range specified in the function call, etc.) and the FaaS function call is assumed to include some search criteria (e.g., a key-word, etc.).

If the return of the search (the items in the searched over files that meet the search criteria) includes a large amount of data (e.g., the content of a large number of files) and the function call is not deemed completed until the calling client device confirms to the application in the cloud 106 that it has successfully received the search results, the cost of the FaaS search function will largely be determined from the delay associated with the large amount of data being transported over the IS infrastructure 100 from the cloud 106 to the client device 108. The cost inefficiency is compounded if certain resources of the IS infrastructure (e.g., trunk lines 105 or 107) are swamped with additional traffic (e.g., the aggregate traffic between all the client devices and the cloud 106) thereby causing them to deliver the data only after a significant amount of time has elapsed (e.g., seconds).

As such, given that FaaS payment structure provides for significant cost reductions if function calls can be completed sooner, an incentive exists to move FaaS functions from the cloud 106 to the edge 101, 102, 103.

Figure 2:
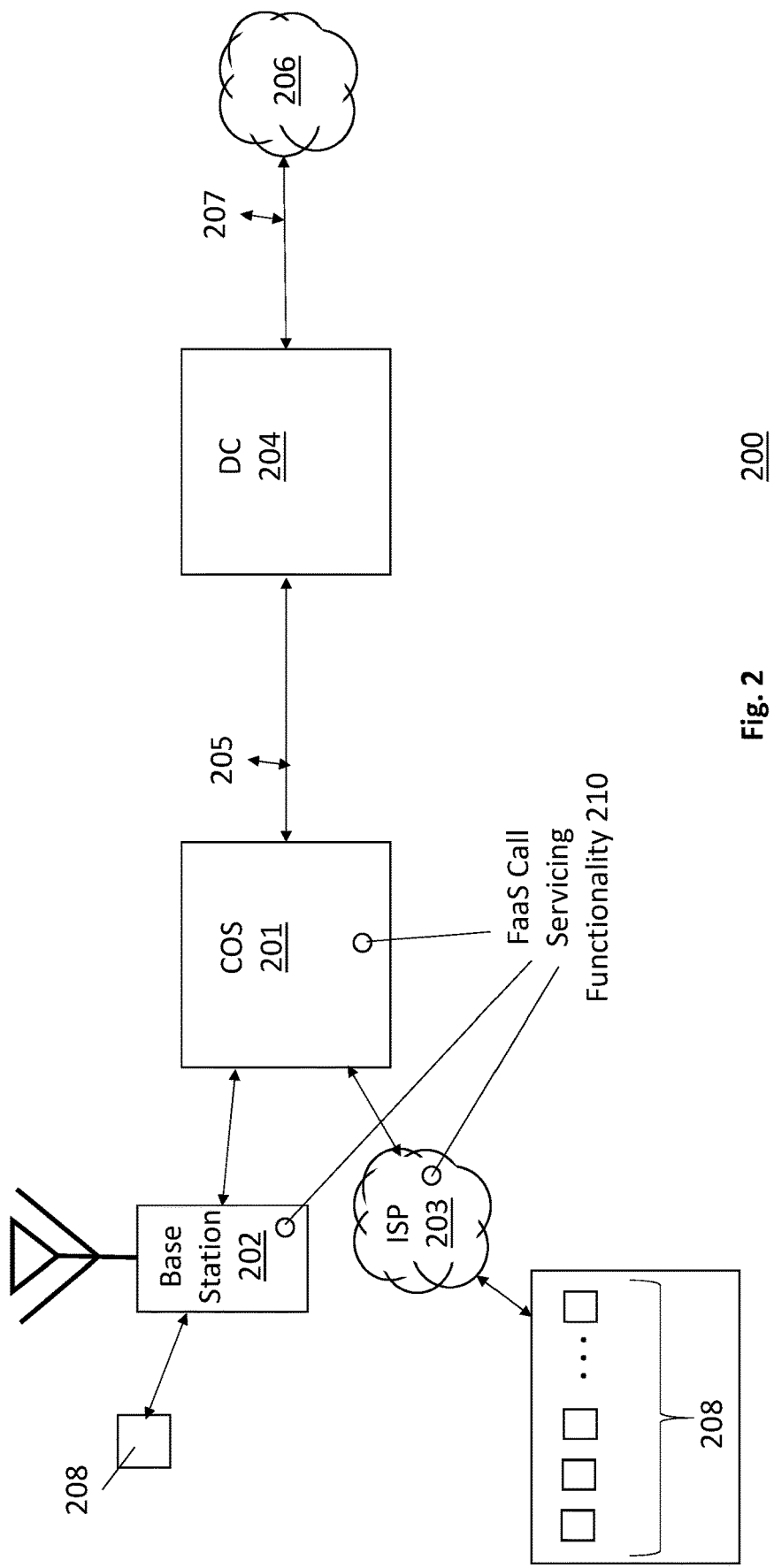
FIG. 2 shows an improved IS infrastructure.

FIG. 2 shows an improved architecture in which FaaS functionality has been integrated into edge components 201, 202 and 203 so as to reduce the aforementioned delays and drive down the costs of FaaS functions. That is, with, e.g., full functionality of various FaaS function calls being performed at an edge component, latency issues associated with large geographic distances and/or multiple nodal hops within an IS infrastructure should be greatly reduced resulting in completion of a called FaaS function in minimal time and correspondingly lower costs given that FaaS tracks usage in very small time increments.

Recalling the FaaS search function example, if the calling client's files are also kept on the same edge component that handles the FaaS search function call, the latency between initial invocation of the function and final completion of the function should be miniscule. Not only are latencies associated with search processing to the edge component's internal latencies but also communication with the client is immediately direct.

Figure 3:
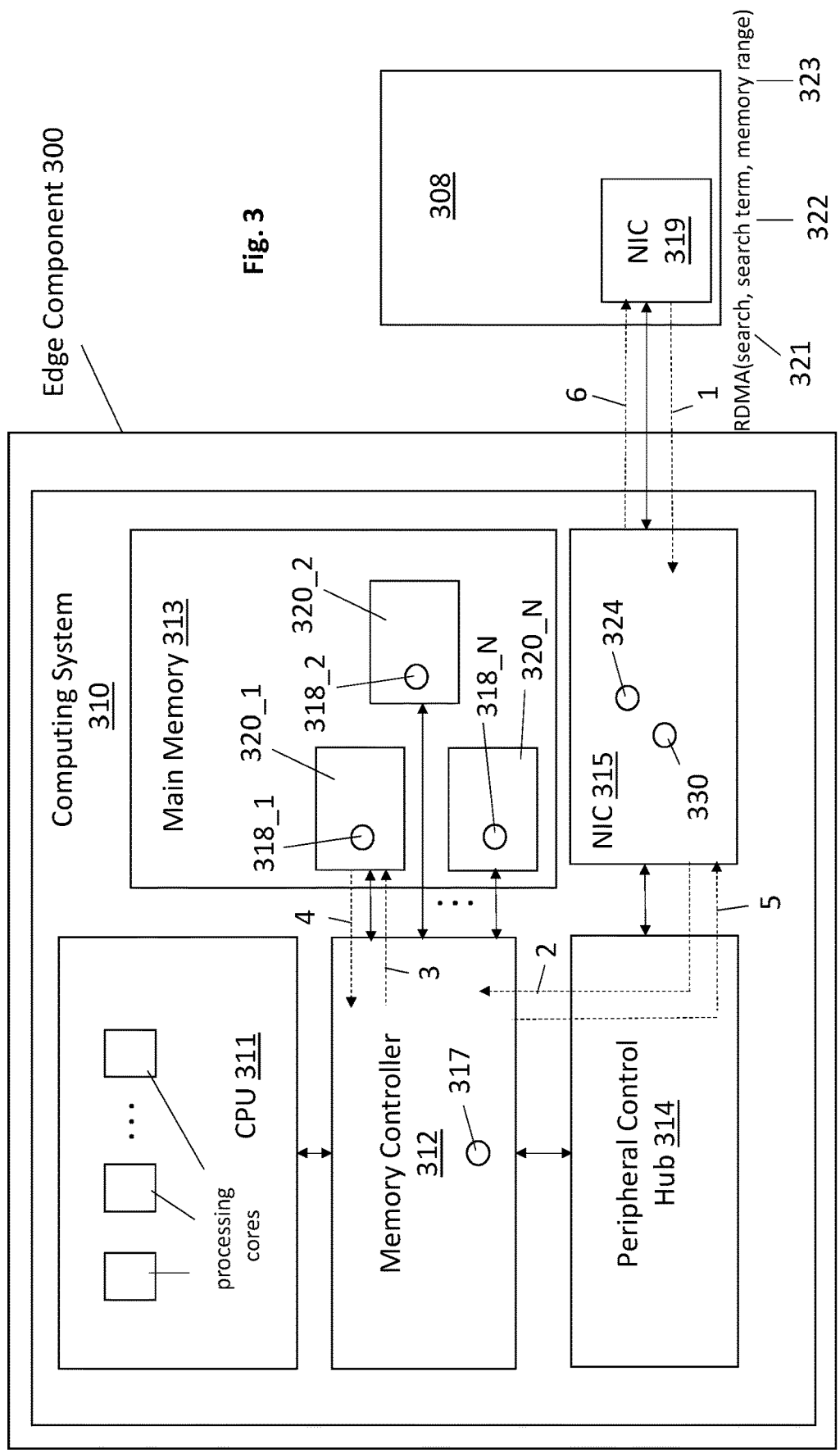
FIG. 3 shows a computing system that handles FaaS function calls.

FIG. 3 shows a more detailed implementation of an edge component 300 having integrated FaaS function call servicing/handling functionality. Here, the edge component 300 includes a computing system 310 that itself includes one or more processing cores 311, a main memory controller 312, a main memory 313, a peripheral control hub 314 and a networking interface card (NIC) 315. The edge component computing system 310 communicates with the client device 308 that invokes the FaaS function call.

The client device includes a NIC 319 that physically transmits the FaaS function call to the edge component 300. Here, in the case of an actual NIC "card", the client device 308 may be a complex system such as a gateway router/switch, tower computer, server computer, etc. In other cases the networking interfacing function 319 may be integrated in some other fashion to the client device 308 (e.g., if the client device is a smartphone the networking interface function may be integrated into a system-on-chip semiconductor chip).

In the example of FIG. 1 an end client (e.g., application software program, specific user computer or mobile device) desires to execute an FaaS function call. The FaaS function call is directed to the client side NIC 319 which physically sends the FaaS function call (if the NIC 319 is integrated into a gateway router/switch or other networking hardware component, the end client is apt to be communicatively coupled to the router/switch via a network (such as a local area network)).

In the example of FIG. 3 the FaaS function call 1 is embedded into a remote direct memory access (RDMA) command so that, as will be more clear further below, the called function is fully performed without invoking the computing system's processing cores 311. Here, as is known in the art, the RDMA is a protocol used in large scale parallel computing clusters so that an application that is executing on one machine can read from or write to the system memory of another machine without invoking the processing cores of the machine with the targeted memory.

More generally, RDMA is a type of protocol that provides for a remote computer's sending of a request (or command) over a network to another (local) computer, where, the request/command asks for some function to be performed by and/or invokes some resource of the local computer (e.g., memory, memory controller, network interface, peripheral control hub, mass storage device, etc.) without invoking the local computer's central processing unit (e.g., its general purpose processing cores) to handle/service the request/command.

For the sake of example, the embodiment of FIG. 3 again pertains to a search function. As observed in FIG. 3, the RDMA command is structured to include the identity of the FaaS function being called and certain parameters associated with the FaaS function being called. Specifically, a first field 321 of the RDMA command identifies that a search function is being called. A second field 322 of the RDMA command includes the search's search criteria (the item(s) to be searched for). A third field 323 of the RDMA command identifies a memory range to be searched over.

Here, in various embodiments, the memory range specified in the third field 323 corresponds to memory space that has been allocated to the end client. In further embodiments such memory space may include non volatile memory space such as persistent memory within the edge component computing system's main memory 313.

The computer industry is presently migrating toward a new system memory paradigm in which byte addressable system memory (also known as "main" memory) is being enhanced to include non volatile memory. Candidates for the non volatile system memory technology include flash as well as emerging non volatile memory technologies (e.g., phase change memory (PCM), dielectric random access memory, magnetic random access memory, spin transfer torque random access memory, ferroelectric random access memory among others). Many of the non volatile memory technologies are extremely high density because they are three dimensional (e.g., the storage cells are stacked above the semiconductor substrate amongst the interconnect wiring of the semiconductor substrate and are made accessible through a cross-point accessing architecture).

With non volatile system memory (or with traditional mass storage (e.g., solid state drive (SSD), hard disk drive) coupled, e.g., to the peripheral control hub 314), the edge component computing system 311 can readily mimic cloud storage for the client device. Here, particularly where the storage resources are physically implemented as non volatile memory within the edge component computing system 313, the "memory range" field 323 of the RDMA command can correspond, e.g., to the cloud storage capacity that has been allocated to the client that is making the function call and/or the application that is executing on the client device and is making the function call.

Upon receipt of the RDMA command 1 by the edge component computing system's NIC 315, the NIC's security logic 324 performs appropriate authentication services to ensure that the calling end client is truly the device/application it claims to be, and, performs authorization services to ensure that the calling end client has been given permission to access the storage space it has specified in the memory range field 323.

In various embodiments, the security logic 324 authenticates the calling end client with a public key and private key scheme. Here, each end client that is permitted to make FaaS function calls to the edge component is assigned a private key. In an embodiment, the client side NIC 319 locally stores in protected register and/or memory space of the NIC 319, the respective private key for each end client that it sends RDMA requests on behalf of and participates in an authentication scheme with the security logic 324 of the edge component NIC 315 as the security logic 324 authenticates the end caller that is calling a FaaS command through an RDMA request.

The edge component NIC 315 securely keeps (e.g., in protected register and/or memory space of the NIC 315) a corresponding public key for each end client private key maintained by the client side NIC 319. Upon receipt of an RDMA request with embedded FaaS function call, the security logic 324 sends the client side NIC 319 an encrypted message using its local public key for the end client that is invoking the FaaS call. The client side NIC 319 decrypts the message using the end client's corresponding private key and sends the decrypted message back to the edge component NIC 315. The security logic 324 examines the decrypted message and, if the decrypted message is correct, the edge component NIC 315 deems the calling end client to be legitimate/authentic.

Once the edge component NIC 315 has deemed the calling end client to be authentic, the NIC 315 proceeds to refer to additional register and/or memory space of the NIC 315 that lists what FaaS functions the authenticated end client is permitted to call and/or what memory address range(s) and/or mass storage space address range(s) the end client is permitted to access. In various embodiments the NIC 315 keeps such meta data for each end client that can invoke an FaaS call to the NIC 315.

With the end client having been properly authenticated and its request to access the specified memory range having been properly authorized, the RDMA command is passed 2 to the memory controller 312 which has special logic 317 to support RDMA commands with embedded FaaS calls. As observed in FIG. 3 the search logic 318 that performs the search (receives data read from the memory range specified in the command and compares the read data to the search criteria) is implemented on a memory module 320 (e.g., dual-in-line memory module (DIMM), stacked memory chip memory module, etc.) that is coupled to the memory controller 312. The memory module(s) 320 and/or interface between the memory module(s) 320 and memory controller 312 may be compliant with an industry standard specification such as a standard specification promulgated by the Joint Electron Device Engineering Council (JEDEC).

Thus, in this case, the special logic 317 on the memory controller 312 is able to comprehend and parse the RDMA command with the embedded FaaS function call 2, and, direct a (e.g., reformatted) command 3 to the memory module(s) 320 whose memory space falls within the address range called out by the FaaS function call 2. The command sent by the memory controller 312 to the module(s) 320 identifies that a search is to performed, identifies the memory address range to be searched over and includes the search criteria.

In the simple case where the called out memory range is entirely on a single memory module 320_1, the memory module's special search logic 318_1 reads the data from its module's memory chips whose memory capacity includes the specified range, compares the read data to the search criteria and sends to the memory controller 312 those of the read data items having content that matches the search criteria 4.

Note that memory channel bandwidth is hardly impacted by performing the actual search on the memory module 320_1 with logic 318_1. That is, if the searching were performed by memory controller's special logic 317, the entirety of the content to be searched (e.g., all of a device's/user's files) would have to be read from the memory module 320_1 and sent to the memory controller 312 over the memory channel that couples the memory module 320_1 and the memory controller 312. If large amounts of data were to be searched (and therefore passed over the memory channel), overall memory performance could be impacted (other transactions would observe delays because the memory channel is overwhelmed sending data to be searched from the memory module 320_1 to the memory controller 312).

After the search results have been received, the memory controller's special logic 317 forms a response to the search request 2 sent by the NIC 315, and sends 5 the response to the NIC 315. The NIC 315 then sends 6 the response to the end client that invoked the search function call. Note that software executing on the processing cores 311 of the edge component computing system 310 can be left entirely out of the end-to-end FaaS call handling process (it is completely managed by the NIC 315, the memory controller 312 and the memory module 320_1).

With various search FaaS function calls, the content to be searched may be kept on the memory capacity of more than one memory module. In this case, the memory controller logic 317 sends a search command, search criteria and applicable memory range to each impacted memory module. Each memory module then performs its own local search and sends its respective search results (the content that matched the search criteria) to the memory controller 312. The memory controller's special logic 317 then combines the individual search results into a single response that is sent 5 to the NIC 315. The NIC 315 sends the response 6 to the client side NIC 319.

Regardless, special logic instances 317 and 318 can be viewed as smart end points because they specifically handle/process the precise request/function called out in the embedded FaaS call.

In an embodiment, the client side NIC 319 maintains a public key and the edge component NIC's security logic 324 maintains a private key so that the client side NIC 319 can confirm that the response is actually being sent from the edge component computer system 310. That is, for example, commensurate with the sending of the response 6 to the client side NIC 319, the client side NIC 319 sends an encrypted message to the edge component NIC 315.

The security logic 324 of the edge component NIC 315 decrypts the message with its private key and sends the decrypted message back to the client side NIC 319. With the correct decrypted message, the client side NIC 319 confirms the response is from the correct sender and forwards the response to the end client that called the FaaS search function. In a more granularized approach, there is a private key maintained by the NIC 315 for each FaaS function that the computing system 310 supports. Accordingly, the client side NIC 319 can confirm that the response is being sent by the specific function that was called.

Although the above example of FIG. 3 has been particularly focused on an FaaS call that relied upon logic circuitry 317, 318 to actually handle the request (a search), other and/or combined embodiments, e.g., that respond to other kinds of FaaS calls embedded in an RDMA command or other similar protocol, may partially or wholly rely upon similar smart end point logic circuitry 330 that is disposed on the edge component NIC 315 and physically handles the FaaS call.

For example, if a simple FaaS read call was embedded in an RDMA command, special logic 330 on the edge component NIC 315 could intercept the RDMA command, parse and comprehend the embedded FaaS read call and then issue a standard RDMA "GET" command to the memory controller 312. In this case, from the memory controller's perspective, the GET command could appear indistinguishable from a nominal RDMA GET command (e.g., sent from a parallel computing system). As such, the memory controller 312 simply reads the requested data from memory 313 and sends it to the NIC 315 via a standard RDMA GET response (as per a normal/standard RDMA protocol).

The special logic 325 on the NIC 315 then sends the read response as per the applicable embedded FaaS protocol to the client side NIC 319. Thus, smart end point logic for handling embedded FaaS calls 317, 318, 330 may be disposed on any of a memory module 320 (and/or similarly, a traditional mass storage device), a memory controller 312 (and/or, interface/controller to a mass storage device such as a peripheral control hub), and/or NIC 315.

Figure 4:
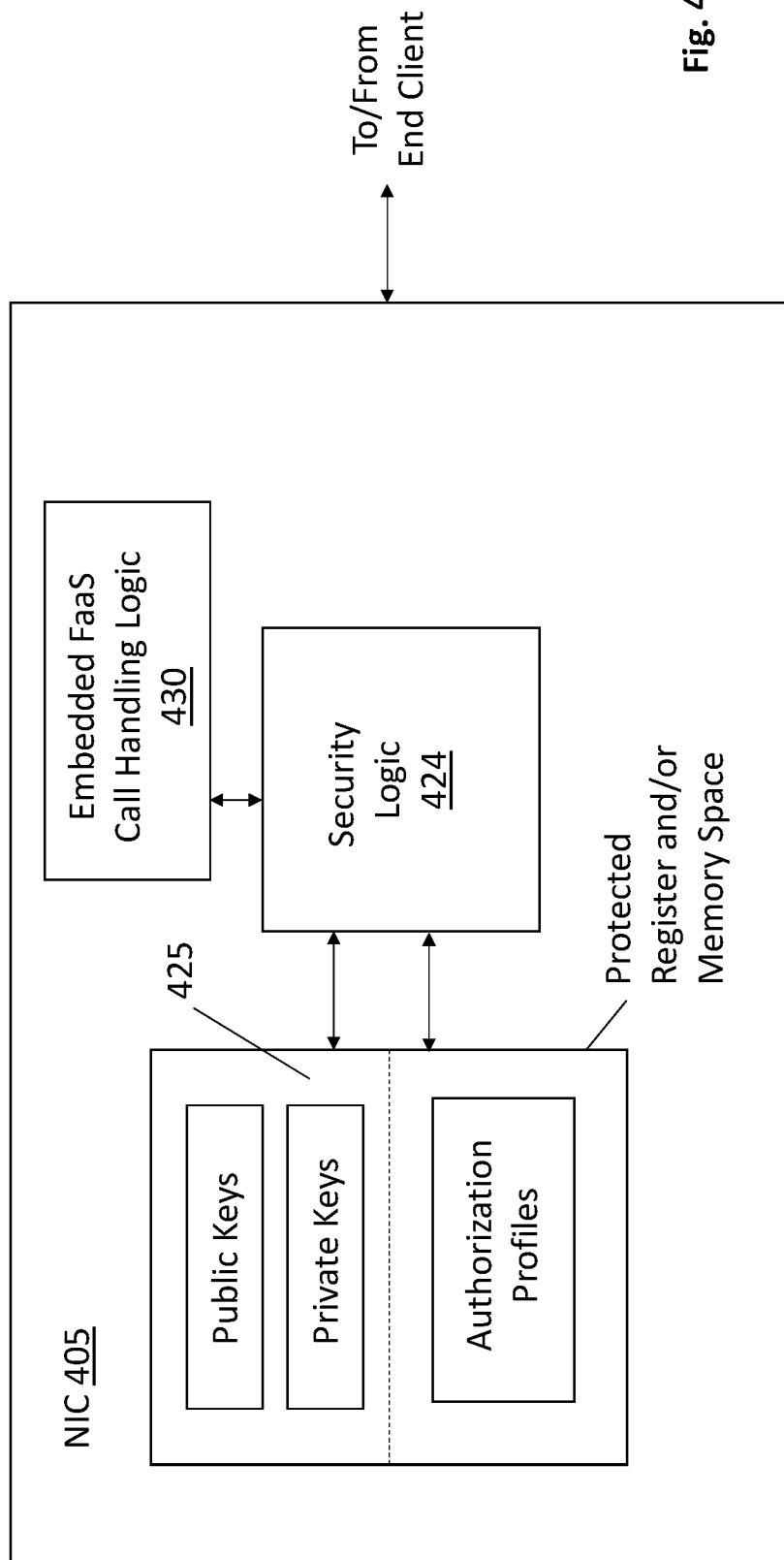
FIG. 4 shows a network interface card (NIC) for use in the computing system of FIG. 3.

FIG. 4 shows an embodiment of an edge component NIC 415 having security logic 424 as discussed above and various circuitry that supports the security logic 424. Here, the security logic 424 performs the actual security functions described above (processing keys, encrypting messages, decrypting messages, etc.). As observed in FIG. 4, the security logic 424 is coupled to secure/protected register and/or memory storage space 425 where its private and public keys are kept. The security logic 424 is also coupled to protected register and/or memory space 426 that keeps authorization profiles for each of the end clients the NIC 415 handles RDMA embedded FaaS calls for. Here, each profile identifies, for each end client, the FaaS functions it is permitted to execute and the memory and/or storage resources it is permitted to access (e.g., as defined by address ranges, directories, etc.). The NIC 415 also includes special logic 430 for physically handling at least one embedded FaaS call.

As alluded to above other FaaS function calls besides searching can be supported and executed by the edge component computing system 310. Examples include encryption, decryption, or a mathematical function. Essentially any "function" whose logic can be implemented in the edge computer 310 can be called upon by an FaaS call. Such functions may support or be a component of, e.g., any/all of a batch process, a stream process and an extract-transform-load process.

As discussed above, for those processes that do not require a read from the edge computing system memory or a write to the edge computing system memory, the actual logic that performs the FaaS function may be located somewhere other than a memory module or main memory controller (e.g., peripheral control hub 314, NIC 315, etc.). Generally, any/all functions could also be executed by the processing cores 311. However, executing at least simple functions with resources other than the processing cores and with dedicated logic elsewhere may minimize internal propagation latencies and therefore cost per FaaS function execute.

The FaaS logic 317, 318, 330 described above (e.g., embedded in memory controller 312, embedded in module 320, embedded in NIC 315, etc.) and/or NIC security logic 324 can be implemented with one or more forms of logic circuitry including dedicated hardwired logic circuitry (e.g., application specification integrated circuit (ASIC) logic circuitry (e.g., one or more state machine circuits and other hardwired logic circuits), programmable logic circuitry (e.g., field programmable gate array (FPGA) logic circuitry) and/or logic circuitry designed to execute some form of program code (e.g., an embedded controller, an embedded processor, etc.). The design of the logic may also be described in a hardware description language (HDL) (e.g., Verilog, VHDL, RTL, transistor netlist, etc.) and recorded on a machine readable medium.

The edge component computing system 300 can be implemented in various ways. For example, according to a first approach the edge component computing system is a complete, wholly integrated computer (e.g., a server computer where all of the main components 311 through 315 are integrated in a same hardware "box" or chassis). According to a second approach the edge component computing system is more distributed. Examples include a large scale "rack" in which one or more of the main components 311 through 315 are implemented on a card or blade and plugged into the rack's backplane, or, more generally, one or more of the main components 311 through 315 are essentially separate physical components that are interconnected to one another through one or more networks.

In any of these embodiments the computing system 300 can be a stand alone computing system, or, be integrated with a network routing or switching function apparatus of an edge component. For example, the computing system 300 can be the control platform, or general purpose computing platform, of a high performance router or switch networking system.

Figure 5:
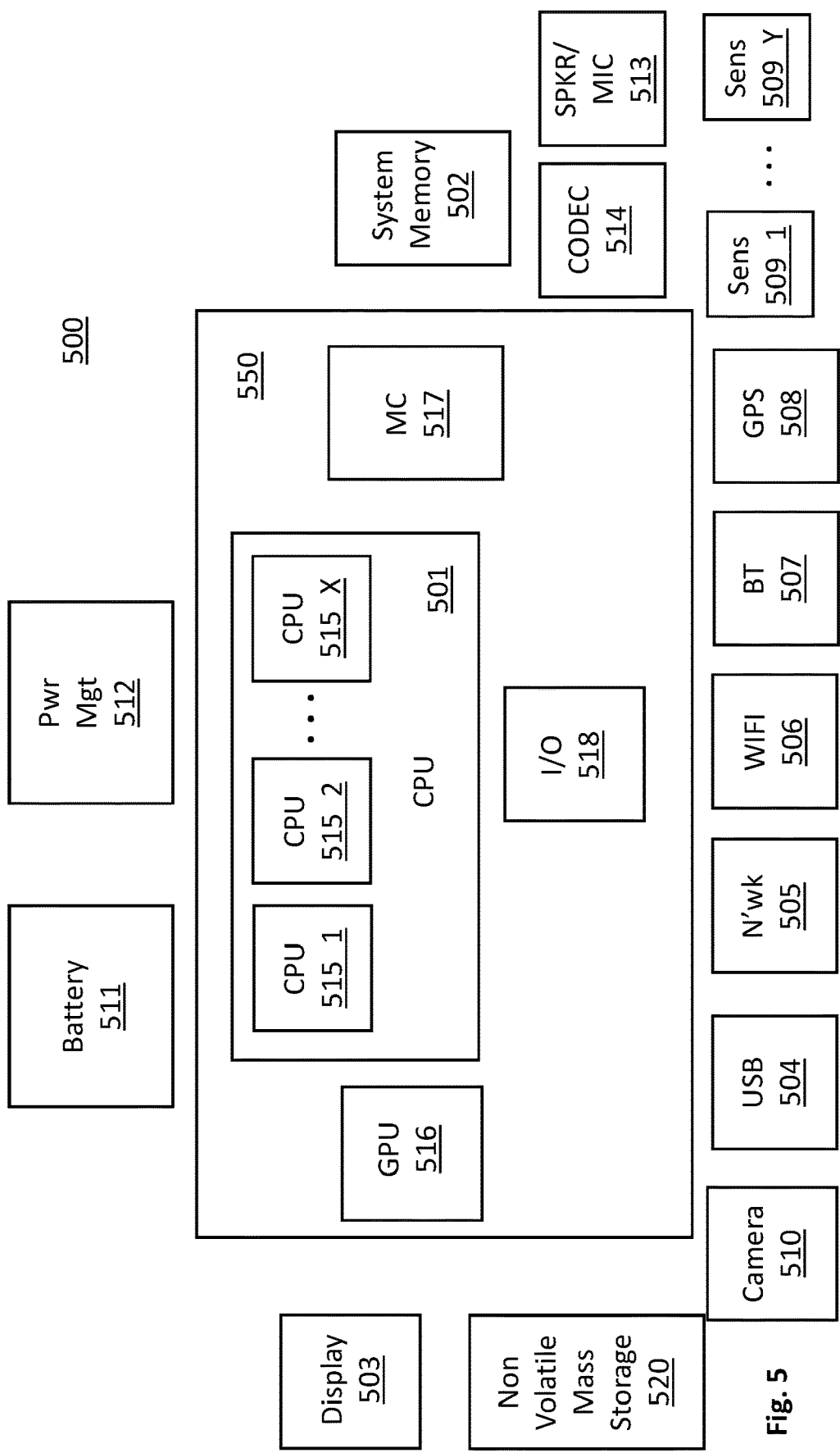
FIG. 5 shows a computing system.

FIG. 5 provides an exemplary depiction of a computing system 500 (e.g., a server computer, a distributed computing system, etc.) that can be used to implemented the computing system 300 of FIG. 3. As observed in FIG. 5, the basic computing system 500 may include a central processing unit 501 (which may include, e.g., a plurality of general purpose processing cores 515_1 through 515_X) and a main memory controller 517 disposed on a multi-core processor or applications processor, system memory 502, a display 503 (e.g., touchscreen, flat-panel), a local wired point-to-point link (e.g., USB) interface 504, various network I/O functions 505 including a NIC (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_Y, one or more cameras 510, a battery 511, a power management control unit 512, a speaker and microphone 513 and an audio coder/decoder 514.

An applications processor or multi-core processor 550 may include one or more general purpose processing cores 515 within its CPU 501, one or more graphical processing units 516, a memory management function 517 (e.g., a memory controller) and an I/O control function 518. The general purpose processing cores 515 typically execute the operating system and application software of the computing system. The graphics processing unit 516 typically executes graphics intensive functions to, e.g., generate graphics information that is presented on the display 503. The memory control function 517 interfaces with the system memory 502 to write/read data to/from system memory 502. The power management control unit 512 generally controls the power consumption of the system 500.

Each of the touchscreen display 503, the communication interfaces 504-507, the GPS interface 508, the sensors 509, the camera(s) 510, and the speaker/microphone codec 513, 514 all can be viewed as various forms of I/O (input and/or output) relative to the overall computing system including, where appropriate, an integrated peripheral device as well (e.g., the one or more cameras 510). Depending on implementation, various ones of these I/O components may be integrated on the applications processor/multi-core processor 550 or may be located off the die or outside the package of the applications processor/multi-core processor 550. The computing system also includes non-volatile storage 520 which may be the mass storage component of the system.

Various components, e.g., other than the CPU 501, may be enhanced to include logic to handle FaaS calls (such as FaaS calls embedded in RDMA requests) as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components. For example an HDL, RTL or transistor level netlist description of the above described comparator and/or ADC may be used to perform a simulation of an electronic circuit in a computer environment.

Therefore elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions and/or data. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A network interface component, comprising:
a network interface;
a host interface;
circuitry to process a service call embedded in a request, the circuitry embedded in the network interface component so that processing of the call is fully performed without execution of the service by a central processing unit of a local computing system that the network interface component is a component of, the request being formatted according to a protocol.

2. The network interface component of claim 1 wherein the circuitry is to direct the service call to a memory module within the local computing system.

3. The network interface component of claim 2 wherein the memory module is a JEDEC compliant memory module.

4. The network interface component of claim 2 wherein the circuitry is to direct the request to at least one other memory module if a memory range specified in the request corresponds to memory space that is only partially within the memory module.

5. The network interface component of claim 4 wherein the circuitry is to combine results from the memory module and the at least one other memory module to prepare a response to the service call.

6. The network interface component of claim 1 wherein the protocol is an RDMA protocol.

7. The network interface component of claim 1 wherein the service call is a read service call.

8. The network interface component of claim 1 wherein the network interface component further comprises additional circuitry to perform at least one security operation for the request.

9. The network interface component of claim 8 wherein the security operation comprises authenticating an end client that the request is to be processed for.

10. The network interface component of claim 9 wherein the network interface component maintains a public key for the end client.

11. The network interface component of claim 8 wherein the security operation comprises authorizing an end client that the request is to be processed for to access a memory range specified in the request.

12. The network interface component of claim 11 wherein the network interface component maintains an authorization profile for the end client.

13. The network interface component of claim 1 wherein the protocol is to allow a remote computing system to respectively access at least one of a memory controller, memory module, peripheral control hub and mass storage device of the local computing system without invoking the central processing unit of the local computing system, the circuitry to at least parse the service call.

14. A computing system, comprising:
one or more processing cores;
a main memory comprising a memory module;
a peripheral control hub;
a mass storage device coupled to the peripheral control hub;
a memory controller coupled between the one or more processing cores and the main memory;
a network interface component comprising a), b) and c) below:
a) a network interface;
b) a host interface;
c) circuitry to process a service call embedded in a request, the circuitry embedded in the network interface component so that processing of the call is fully performed without execution of the service by the one or more processing cores, the request being formatted according to a protocol.

15. The computing system of claim 14 wherein the circuitry is to direct the service call to a memory module within the local computing system.

16. The computing system of claim 15 wherein the memory module is a JEDEC compliant memory module.

17. The computing system of claim 15 wherein the circuitry is to direct the request to at least one other memory module if a memory range specified in the request corresponds to memory space that is only partially within the memory module.

18. The computing system of claim 17 wherein the circuitry is to combine results from the memory module and the at least one other memory module to prepare a response to the service call.

19. The computing system of claim 14 wherein the protocol is an RDMA protocol.

20. The computing system of claim 14 wherein the protocol is to allow a remote computing system to respectively access at least one of the memory controller, the memory module, the peripheral control hub and the mass storage device without invoking the one or more processing cores, the circuitry to at least parse the service call.

* * * * *